(12) United States Patent  
Abe et al.

(10) Patent No.: US 11,027,766 B2  
(45) Date of Patent: Jun. 8, 2021

(54) STEERING APPARATUS

(71) Applicant: JTEKT CORPORATION, Osaka (JP)

(72) Inventors: Satoshi Abe, Yamatotakada (JP); Yoshitaka Miyanaga, Kashiba (JP); Norihito Tanaka, Fujiidera (JP); Satoshi Matoba, Nabari (JP)

(73) Assignee: JTEKT CORPORATION, Osaka (JP)

( * ) Notice: Subject to any disclaimer, the term of this patent is extended or adjusted under 35 U.S.C. 154(b) by 0 days.

(21) Appl. No.: 16/686,507

(22) Filed: Nov. 18, 2019

(65) Prior Publication Data

US 2020/0198686 A1   Jun. 25, 2020

(30) Foreign Application Priority Data

Dec. 25, 2018   (JP) .............................. JP2018-241294

(51) Int. Cl.
  B62D 1/19   (2006.01)
(52) U.S. Cl.
  CPC .................................... B62D 1/197 (2013.01)
(58) Field of Classification Search
  CPC ........ B62D 1/197; B62D 1/187; B62D 1/192; B62D 1/19; B62D 1/195
  See application file for complete search history.

(56) References Cited

U.S. PATENT DOCUMENTS

| | | | |
|---|---|---|---|
| 5,618,058 A * | 4/1997 | Byon ..................... | B62D 1/197 280/777 |
| 5,845,936 A * | 12/1998 | Higashino .............. | B62D 1/192 280/775 |
| 2007/0026952 A1 * | 2/2007 | Gokano .................. | F16C 3/035 464/162 |
| 2007/0234838 A1 * | 10/2007 | Sadakata ................ | B62D 1/192 74/492 |
| 2009/0066070 A1 * | 3/2009 | Ueno ..................... | B62D 1/187 280/775 |

(Continued)

FOREIGN PATENT DOCUMENTS

| | | |
|---|---|---|
| EP | 1544075 A1 | 6/2005 |
| EP | 3357789 A2 | 8/2018 |

(Continued)

OTHER PUBLICATIONS

May 8, 2020 Search Report issued in European Patent Application No. 19211810.7.

*Primary Examiner* — Paul N Dickson  
*Assistant Examiner* — Mary E Young  
(74) *Attorney, Agent, or Firm* — Oliff PLC (57) ABSTRACT

A steering apparatus includes: a column shaft; a column tube supporting the column shaft; a housing movably supporting the column tube; a fastener configured to fix the position of the column tube by pressing on radial ends of the housing; a first impact absorber configured to generate a first dynamic friction force with the column tube; and a second impact absorber configured to generate a second dynamic friction force with the housing during a secondary collision by being moved by the first impact absorber. The first impact absorber is structured such that a distal static friction coefficient in a distal region located further from a squeezing portion of the fastener is less than a proximal static friction coefficient in a proximal region closer to the squeezing portion.

7 Claims, 4 Drawing Sheets

(56) References Cited

U.S. PATENT DOCUMENTS

| | | |
|---|---|---|
| 2018/0222520 A1 | 8/2018 | Nagatani et al. |
| 2018/0229757 A1* | 8/2018 | Yamaoka ............... B62D 1/192 |
| 2018/0229758 A1* | 8/2018 | Sakuda ................. B62D 1/184 |

FOREIGN PATENT DOCUMENTS

| | | |
|---|---|---|
| EP | 3360755 A1 | 8/2018 |
| EP | 3360756 A1 | 8/2018 |
| JP | 2011-084156 A | 4/2011 |
| JP | 2018-127062 A | 8/2018 |

* cited by examiner

STEERING APPARATUS

INCORPORATION BY REFERENCE

The disclosure of Japanese Patent Application No. 2018-241294 filed on Dec. 25, 2018 including the specification, drawings and abstract is incorporated herein by reference in its entirety.

BACKGROUND

1. Technical Field

The disclosure relates to a steering apparatus for steering vehicles.

2. Description of Related Art

A known steering apparatus includes a column tube rotatably supporting a column shaft to be coupled to a steering member and a housing slidably supporting the column tube and to be fixed to a vehicle (for example, the steering apparatus disclosed in Japanese Unexamined Patent Application Publication No. 2018-127062 (JP 2018-127062 A)). This steering apparatus has an impact absorbing mechanism for absorbing the impact of a secondary collision caused by a vehicle collision. The impact absorbing mechanism converts an impact force moving the column tube into the housing to a friction force. In this way, the impact absorbing mechanism gradually absorbs the impact of a secondary collision, thus protecting a driver from the impact.

SUMMARY

In the case of a steering apparatus having multiple portions for generating dynamic friction forces used to absorb the impact, the structure of the steering apparatus is designed such that the dynamic friction forces are generated in a predetermined order, i.e., such that the portions start moving sequentially in a predetermined order so as to absorb the impact in a predetermined profile. However, according to studies by the inventors of the present application, the dynamic friction forces may be generated during a secondary collision in an order different from a designed order. If such unintentional dynamic friction forces are generated, the impact is not absorbed in a designed profile.

A purpose of the disclosure is to provide a steering apparatus for absorbing the impact of a secondary collision in a predetermined order.

An aspect of the disclosure provides a steering apparatus including a column shaft, a column tube, a housing, a fastener, a first impact absorber, and a second impact absorber. The column shaft is coupled to a steering member. The column tube rotatably supports the column shaft. The column tube is inserted through the housing, and the housing supports the column tube movably in an axial direction. The fastener is configured to fix a position of the column tube by squeezing the housing from outside the column tube such that a portion of the housing in the axial direction is reduced in diameter. The first impact absorber includes an annular portion attached to and in contact with an outer perimeter of the column tube. The first impact absorber is configured to generate a first dynamic friction force with the column tube during a secondary collision. The second impact absorber is fixedly connected to the housing by a squeezing force of the fastener. The second impact absorber is configured to generate a second dynamic friction force with the housing during the secondary collision by being moved by the first impact absorber moving together with the column shaft. The first impact absorber has a proximal static friction coefficient in a proximal region and a distal static friction coefficient less than the proximal static friction coefficient in a distal region. The proximal region is located close to a squeezing portion of the fastener in a radial direction crossing both the axial direction and a squeezing direction of the fastener. The distal region is located further from the squeezing portion than the proximal region in the radial direction.

According to the above aspect, the dynamic friction forces used to absorb the impact are generated in a predetermined order (profile).

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

A steering apparatus according to an embodiment of the disclosure is described below with reference to the drawings. The embodiment illustrates general or specific examples. Numerical values, shapes, materials, structural elements, arrangement and connection of the structural elements, steps, the execution order of steps, etc. described in the embodiment are merely examples and are not intended to limit the disclosure. Of all structural elements described in the embodiment, structural elements that are not recited in an independent claim most broadly defining the inventive concept of the disclosure are optional, nonessential elements.

The drawings are diagrammatic sketches, including emphasis, omission, and proportion adjustment that are made as necessary to illustrate the disclosure, and may not reflect actual shapes, actual positional relations, and actual proportions.

Figure 1:
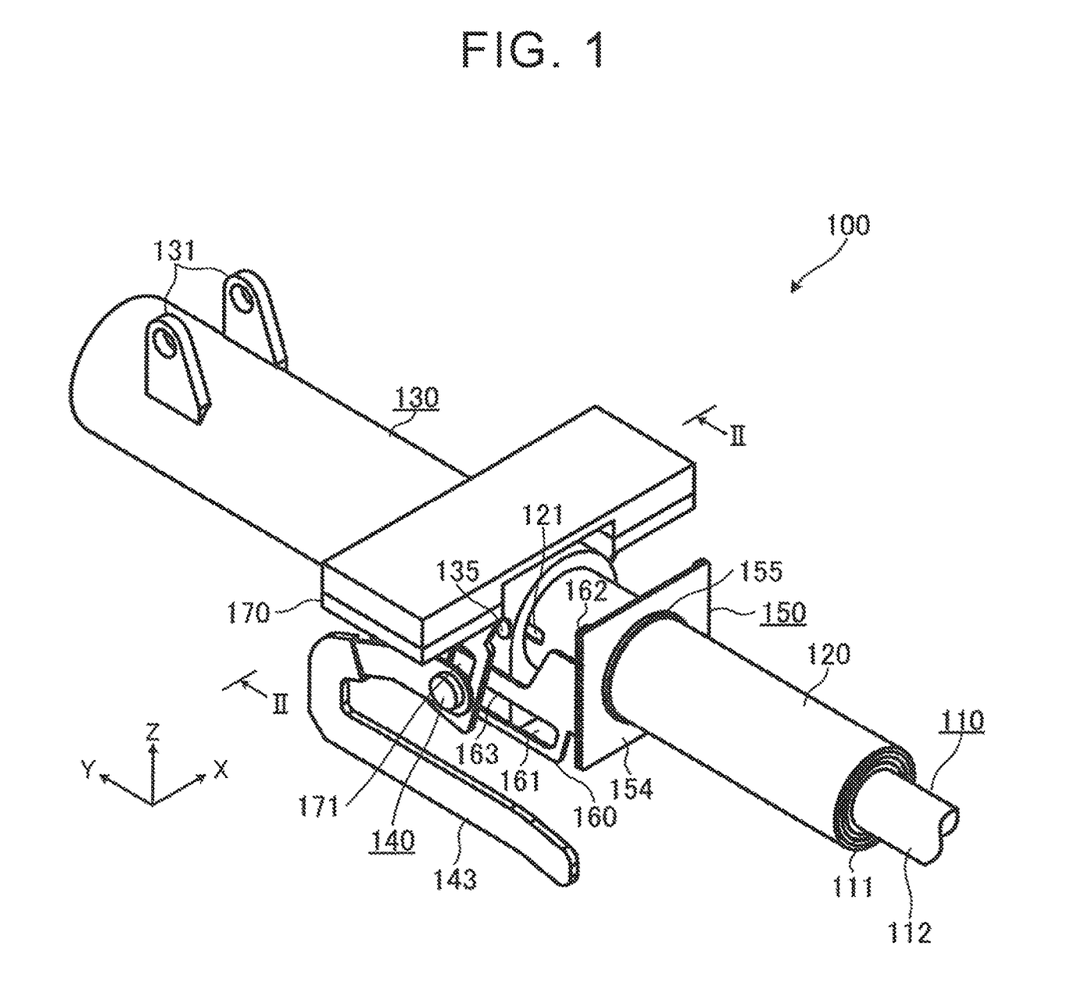
FIG. 1 is a perspective view illustrating the structure of a steering apparatus according to an embodiment of the disclosure.
Figure 2:
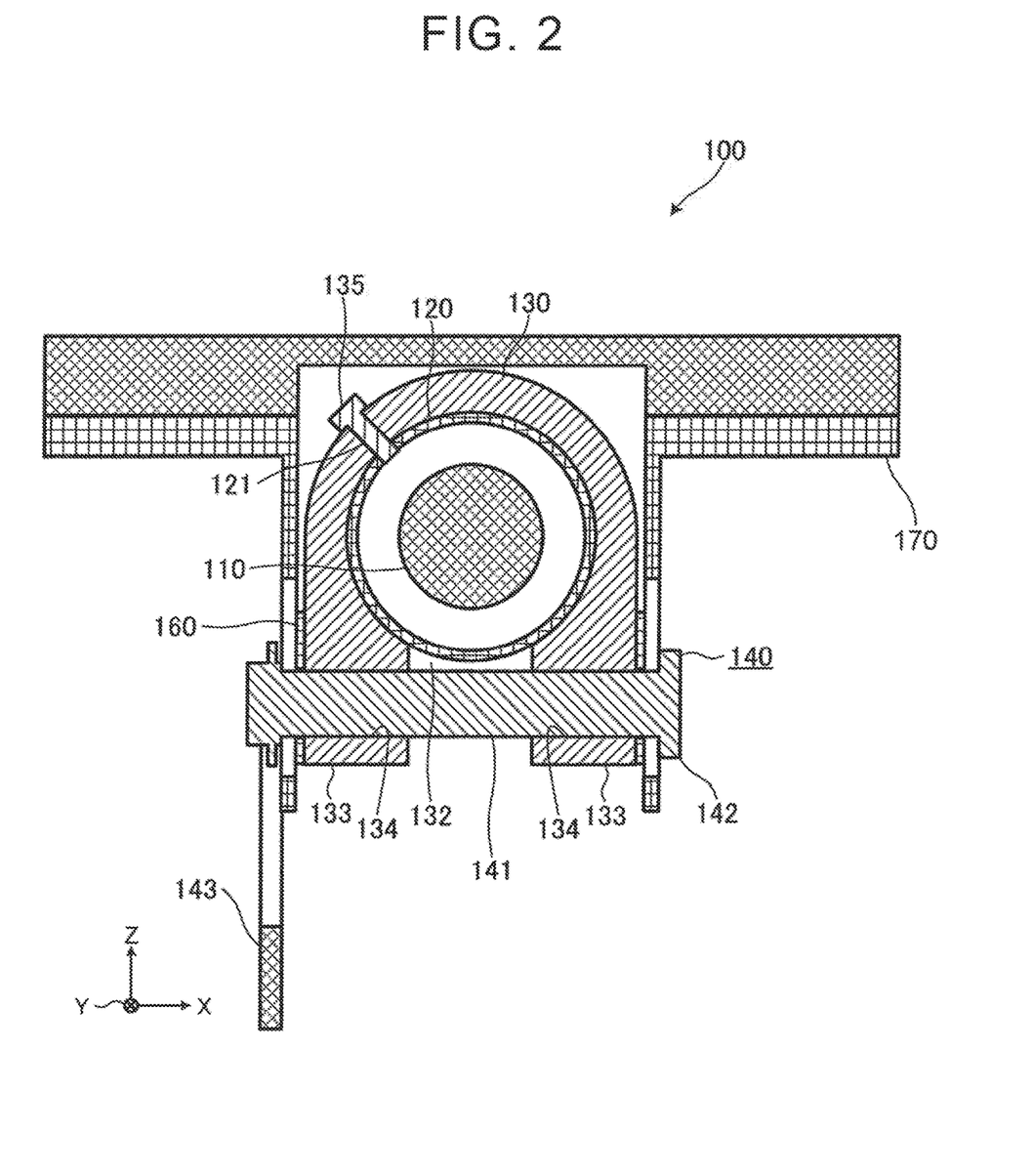
FIG. 2 is a cross-sectional view of the steering apparatus taken along line II-II in FIG. 1.

FIG. 1 is a perspective view illustrating the structure of the steering apparatus 100. FIG. 2 is a cross-sectional view of the steering apparatus 100 taken along line II-II in FIG. 1. The steering apparatus 100 turns steered wheels of a vehicle in accordance with a steering input from a driver of the vehicle. As illustrated in FIGS. 1 and 2, the steering apparatus 100 includes a column shaft 110, a column tube 120, a housing 130, a fastener 140, a first impact absorber 150, and second impact absorbers 160. Although not described and illustrated herein, the steering apparatus 100 further includes a shaft member coupled to the column shaft 110, such as an intermediate shaft, and a steering operation mechanism, such as a rack and pinion mechanism.

In normal use of the steering apparatus 100 where there is no collision, the position of a steering member to be operated by a driver is adjustable, for example, to accommodate the driver's physique by untightening the fastener 140 and then by sliding the column tube 120 relative to the housing 130 in the axial direction of the column tube 120 (a Y-axis direction in the drawings). The position of the column tube 120 is fixed by tightening the fastener 140 so that the housing 130 is squeezed. In the steering apparatus 100 according to the embodiment, the inclination of the housing 130 relative to the vehicle body is adjustable and is fixed and unfixed by the fastener 140.

The column shaft 110 is coupled to the steering member at one end and transmits the steering angle of the steering member to the steering operation mechanism. The column shaft 110 is inserted through the housing 130 and is rotatably supported by the column tube 120. According to the embodiment, the column shaft 110 is supported by a first bearing 111 in the column tube 120 such that the column shaft 110 is fixed in position relative to the column tube 120 in the axial direction and is rotatable relative to the column tube 120 in a circumferential direction. The column shaft 110 extends and retracts without interfering with transmission of the steering angle, as the column tube 120 moves out of and into the housing 130. Specifically, the column shaft 110 includes a first shaft body 112 supported by the first bearing 111 and a second shaft body (not illustrated) supported by a second bearing (not illustrated) in the housing 130. The first shaft body 112 and the second shaft body form a telescopic structure. Specifically, as the column tube 120 moves out of and into the housing 130, the first shaft body 112 moves out of and into the second shaft body, so that the column shaft 110 extends and retracts. Further, the first shaft body 112 and the second shaft body are splined together so that the steering angle of the steering member is transmittable therebetween.

The column tube 120 rotatably supports the column shaft 110 and is sometimes called a column jacket. The column tube 120 is supported by the housing 130 attached to the vehicle body and thus allows the steering member to be located in a certain positon via the column shaft 110. The column tube 120 is not limited to a particular shape. According to the embodiment, the column tube 120 has a (hollow) circular cylindrical shape, and the housing 130 has a through hole extending therethrough in the axial direction. The column tube 120 is inserted through the through hole in the housing 130 and is supported by the housing 130 under this condition. The column tube 120 supports the column shaft 110 inside via the first bearing 111 and is movable as a unit with the column shaft 110 relative to the housing 130 in the axial direction (the Y-direction in the drawings).

According to the embodiment, the column tube 120 has an elongated tube hole 121 extending in the axial direction and penetrating therethrough in a radial direction. A third impact absorber 135 having a pin shape is fixed to the housing 130 and is inserted through the elongated tube hole 121. The third impact absorber 135 is located in the elongated tube hole 121 and does not interfere with the movement of the column tube 120 relative to the housing 130 in the normal use. In the normal use, the distance by which the column tube 120 moves relative to the housing 130 in the axial direction is restricted by the abutment of the third impact absorber 135 against a longitudinal end edge of the elongated tube hole 121.

When a secondary collision occurs, the end edge of the elongated tube hole 121 breaks the third impact absorber 135. The third impact absorber 135 absorbs the impact of a secondary collision by being broken, thereby reducing the impact on a driver.

The housing 130 is a tubular member and supports the column tube 120 such that the column tube 120 is movable relative to the vehicle body in the axial direction (the Y-axis direction in the drawings). As illustrated in FIG. 2, the housing 130 has a slit-shaped squeezing margin 132 and a pair of squeezable portions 133, at one end closer to the steering member (i.e., at one end closer to the rear of the vehicle) in the axial direction. The squeezing margin 132 penetrates the circumferential wall of the housing 130 in the radial direction (the Z-axis direction in the drawings) and extends in the axial direction. The squeezable portions 133 protrude in the radial direction from respective sides of the squeezing margin 132. Each of the squeezable portions 133 has a through hole 134 that extends perpendicular to both of the following directions: the direction (i.e., the radial direction) in which the squeezing margin 132 penetrates the circumferential wall of the housing 130; and the axial direction of the column tube 120. As described in detail later, the fastener 140 has a squeezing shank 141 inserted through the through holes 134. The fastener 140 is used to reduce the distance between the squeezable portions 133 located facing each other. Reducing the distance between the squeezable portions 133 causes the housing 130 to press around the column tube 120 inserted through the housing 130 and thereby to fixedly support the column tube 120.

According to the embodiment, the housing 130 has a pair of first hinge members 131 protruding from near its end that is further from the steering member (closer to the front of the vehicle) in the axial direction (the Y-axis direction in the drawings). The pair of first hinge members 131 is rotatably coupled by a shaft member to a second hinge member (not illustrated) fixed to the vehicle body so that the housing 130 is tiltably fixed with respect to the vehicle body. Two mounting brackets 170 are located closer to the steering member (closer to the rear of the vehicle) than the first hinge members 131. The mounting brackets 170 are located opposite each other across the squeezable portions 133. The mounting brackets 170 are to be fixed to the vehicle body. Each of the mounting brackets 170 includes an elongated mounting hole 171 that is shaped in an arc with a center coincident with the center of rotation of the first hinge members 131. The mounting brackets 170 are pressed against the squeezable portions 133 of the housing 130 by the fastener 140 inserted through the elongated mounting hole 171 so that the housing 130 is fixed at a certain tilt position.

The fastener 140 fixes the position of the column tube 120 by pressing on radial ends of the housing 130 from outside the column tube 120. According to the embodiment, the squeezing shank 141 of the fastener 140 is inserted through the through holes 134 in the squeezable portions 133 of the housing 130. The squeezable portions 133 each extend integrally from the housing 130 and are located opposite each other across the squeezing margin 132 of the housing 130. The squeezing shank 141 has a flange portion 142 at one end. The flange portion 142 engages with the periphery of the through hole 134 in the squeezable portion 133. The fastener 140 includes a fastener lever 143 having a cam for squeezing and unsqueezing the housing 130. The fastener lever 143 is located on the opposite side of the squeezing shank 141 from the flange portion 142.

According to the embodiment, one mounting bracket 170 and one second impact absorber 160 are located outside each of the paired squeezable portions 133, and the mounting bracket 170 and the second impact absorber 160 are pressable against the corresponding squeezable portion 133 by the fastener 140. Operating the fastener lever 143 of the fastener 140 in a manner that reduces the distance between the paired squeezable portions 133 causes the housing 130 to squeeze the column tube 120 and thus to fix the position of the column tube 120. When the position of the column tube 120 is fixed by the fastener 140 in this way, each of the two second impact absorbers 160 is pressed against the outer surface of the corresponding squeezable portion 133 of the housing 130. This generates a normal force that results in a second dynamic friction force in the event of a secondary collision. Further, when the position of the column tube 120 and the second impact absorbers 160 in the normal use are fixed by the fastener 140, the mounting brackets 170 are pressed against the squeezable portions 133 via the second impact absorbers 160, so that the tilt position of the housing 130 is also fixed.

Figure 3:
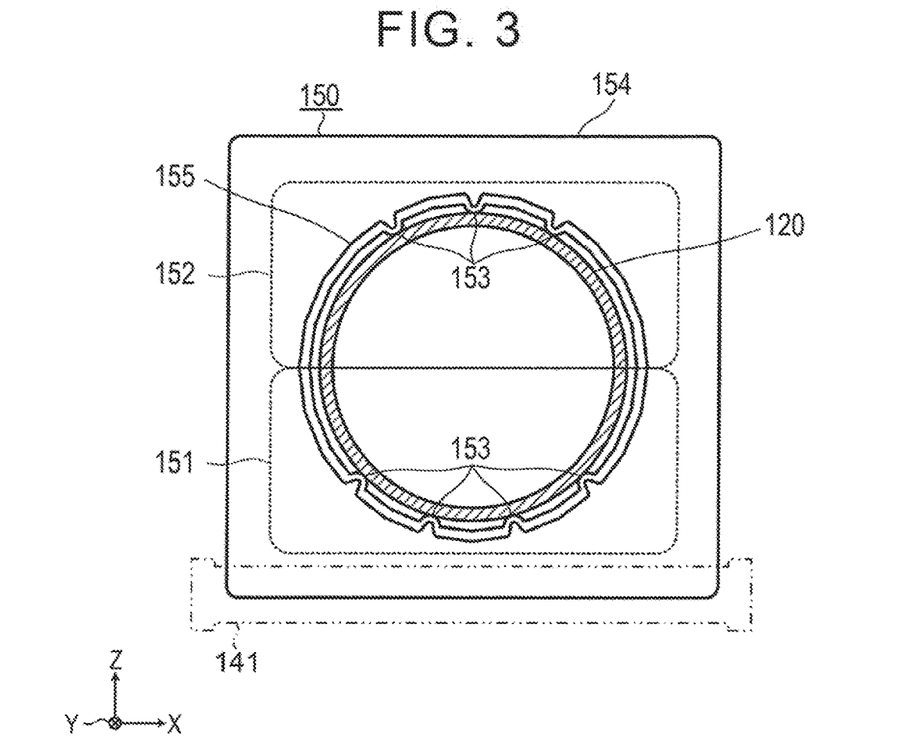
FIG. 3 is a plan view illustrating cross sections of a first impact absorber and a column tube.
Figure 4:
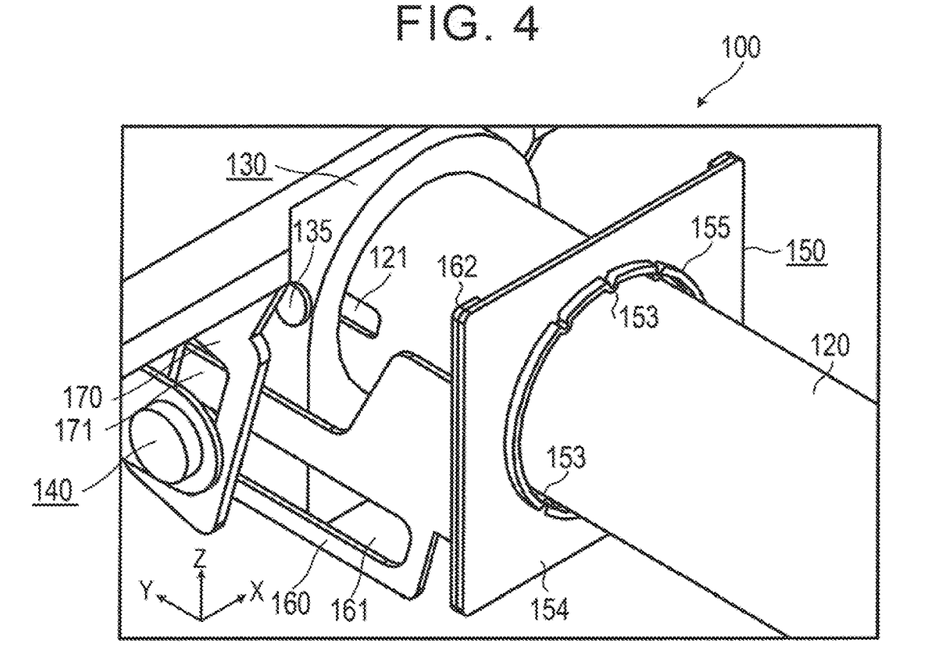
FIG. 4 is a perspective view of a portion of the steering apparatus including the first impact absorber.

FIG. 3 is a plan view illustrating cross sections of the first impact absorber 150 and the column tube 120. FIG. 4 is a perspective view of a portion of the steering apparatus 100 including the first impact absorber 150. As illustrated in these drawings, the first impact absorber 150 has an annular portion that is fixedly attached to the column tube 120 while being in contact with the outer perimeter of the column tube 120. Thus, in the normal use, the first impact absorber 150 is movable as a unit with the column tube 120. In contrast, in the event of a secondary collision, the first impact absorber 150 slides relative to the column tube 120 and thus generates a first dynamic friction force with the column tube 120 to absorb the impact of the secondary collision.

The maximum static friction coefficient between the first impact absorber 150 and the column tube 120 in the normal use has the following relationship. The maximum static friction coefficient is less in a distal region 152 (an upper region closed by a dashed line in FIG. 3) than in a proximal region 151 (a lower region enclosed by a dashed line in FIG. 3). The proximal region 151 is located close to the squeezing shank 141, which serves as a squeezing portion of the fastener 140, in a radial direction (the Z-axis direction in the drawings) crossing both the axial direction (the Y-axis direction in the drawings) and a squeezing direction (the X-axis direction in the drawings) of the fastener 140. The distal region 152 is located further from the fastener 140 than the proximal region 151 in the radial direction crossing both the axial direction and the squeezing direction. The maximum static friction coefficient in the distal region 152 is hereafter referred to as a distal static friction coefficient, and the maximum static friction coefficient in the proximal region 151 is hereafter referred to as a proximal static friction coefficient. According to the embodiment, to satisfy the above relationship of the maximum static friction coefficient, the first impact absorber 150 and the column tube 120 are structured such that an area of contact between the first impact absorber 150 and the column tube 120 is less in the distal region 152 than in the proximal region 151. This structure ensures that the distal static friction coefficient is less than the proximal static friction coefficient. It is noted that the proximal region 151 and the distal region 152 have the same size.

More specifically, according to the embodiment, at least one of the first impact absorber 150 and the column tube 120 has protrusions 153 in contact with the other of the first impact absorber 150 and the column tube 120 in both the proximal region 151 and the distal region 152, and the number of protrusions 153 in the distal region 152 is less than the number of protrusions 153 in the proximal region 151 so that the distal static friction coefficient across the entire distal region 152 is less than the proximal static friction coefficient across the entire proximal region 151. According to the embodiment, as illustrated in FIG. 4, the first impact absorber 150 includes a rectangular, plate-shaped base 154 having a hole through which the column tube 120 is inserted, and a tubular portion 155 projecting in the axial direction is provided around the edge of the hole. The tubular portion 155 has the protrusions 153. Each of the protrusions 153 has a ridge shape, protrudes toward the column tube 120, and extends in the axial direction. Thus, the protrusions 153 are in line contact with the outer surface of the column tube 120. It is easier to form the protrusions 153 on the first impact absorber 150 like this than to form the protrusions 153 on the column tube 120, because the first impact absorber 150 is smaller in size. The distal static friction coefficient and the proximal static friction coefficient are adjustable by changing the number of protrusions 153. This leads to improvement in reproducibility and controllability of the maximum static friction force.

Any suitable method may be used to attach the first impact absorber 150 to the column tube 120. For example, the first impact absorber 150 may be attached to the column tube 120 by press-fit insertion. As another example, after the column tube 120 is inserted through the first impact absorber 150, the protrusions 153 may be pressed against the outer circumferential surface of the column tube 120 by being partially swaged on the column tube 120.

In the normal use, each of the second impact absorbers 160 is fixedly connected to the corresponding squeezable portion 133 by the squeezing force of the fastener 140. In the event of a secondary collision, the second impact absorber 160 is moved by the first impact absorber 150 moving together with the column tube 120 moving into the housing 130, thus generating the second dynamic friction force with the squeezable portion 133.

According to the embodiment, each of the second impact absorbers 160 includes a plate-shaped joint portion 162 and a plate-shaped contact portion 163. The contact portion 163 is in surface contact with the outer surface of the squeezable portion 133 of the housing 130. The joint portion 162 extends on a plane (a XZ-plane in the drawings) normal to the axial direction (the Y-axis direction in the drawings) and connects to the contact portion 163. The second impact absorber 160 is structured such that the contact portions 163 are located opposite each other across the two squeezable portions 133 in a plane-symmetrical manner and such that the joint portions 162 are located opposite each other across the two squeezable portions 133 in a plane-symmetrical manner. The two joint portions 162 are each joined to the base 154 of the first impact absorber 150 so that the first impact absorber 150 and the second impact absorber 160 are integrated together into a single structure. Thus, in the normal use, when the fastener 140 is untightened, the first impact absorber 150 allows the second impact absorber 160 to move as a unit with the column tube 120 in the axial direction. The contact portion 163 has an elongated hole 161 that extends in the axial direction (the Y-axis direction in the drawings) and that has a width sufficient to allow the squeezing shank 141 of the fastener 140 to be inserted therethrough. The contact portion 163 is pressed against the squeezable portion 133 of the housing 130 by the fastener 140 having the squeezing shank 141 inserted through the elongated hole 161 so that the second impact absorber 160 is fixed to the housing 130. According to the embodiment, since the second impact absorber 160 is sandwiched between the squeezable portion 133 and the mounting bracket 170, a dynamic friction force is generatable between the second impact absorber 160 and the mounting bracket 170. This dynamic friction force may be included in the second dynamic friction force.

Next, how the steering apparatus 100 operates is described.

In the normal use, when a driver untightens the fastener 140 to unsqueeze the housing 130 by operating the fastener lever 143, the housing 130 is made rotatable about the first hinge members 131, and both the column tube 120 and the column shaft 110 are made movable relative to the housing 130 in the axial direction. In this untightened condition of the fastener 140, the driver adjusts the steering member to a comfortable position for the driver by moving the steering member up, down, forward, and backward. After the adjustment is completed, the driver fixes the position of the steering member by tightening the fastener 140. In the untightened condition, as the column tube 120 is moved out of and into the housing 130, the first impact absorber 150 fixed to the column tube 120 is moved as a unit with the column tube 120 in the axial direction, and the second impact absorber 160 is also moved as a unit with the first impact absorber 150.

In the event of a vehicle collision causing a secondary collision between a driver and the steering member, a strong force exerts on the column tube 120 in a direction that moves the column tube 120 into the housing 130. Since the maximum static friction force between the first impact absorber 150 and the column tube 120 is set greater than the maximum static friction force between the housing 130 and the second impact absorbers 160 fastened together by the fastener 140, sliding between the second impact absorbers 160 and the squeezable portions 133 of the housing 130 occurs before sliding between the first impact absorber 150 and the column tube 120. As a result, a second dynamic friction force DF2 is generated between the second impact absorbers 160 and the squeezable portions 133. The second dynamic friction force DF2 absorbs the impact of the secondary collision. In this case, a dynamic friction force is also generated between the housing 130 and the column tube 120, and this dynamic friction force also absorbs the impact of the secondary collision.

Figure 5:
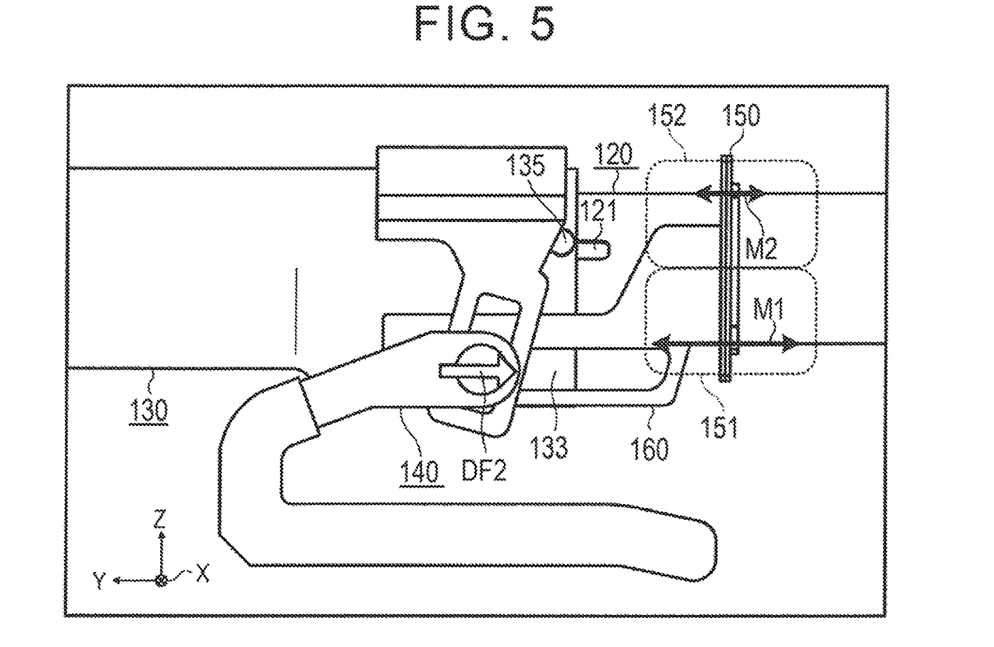
FIG. 5 is a side view of a portion of the steering apparatus including the first impact absorber and a second impact absorber.

As illustrated in FIG. 5, the second dynamic friction force DF2 is generated outside the column tube 120, between the second impact absorbers 160 and the squeezable portions 133. Thus, the second impact absorbers 160 and the first impact absorber 150 integrated with the second impact absorbers 160 receive a force that twists the first impact absorber 150 and the second impact absorbers 160 relative to the column tube 120. If the friction coefficient between the first impact absorber 150 and the column tube 120 is constant in the circumferential direction of the column tube 120, the first impact absorber 150 may be twisted relative to the column tube 120 by the twisting force of the first impact absorber 150 and the second impact absorbers 160. This may cause a phenomenon where the first impact absorber 150 starts sliding over the column tube 120 during sliding of the second impact absorbers 160 relative to the squeezable portions 133. If such a phenomenon occurs, the impact is not absorbed in a designed profile.

In contrast, according to the embodiment, the number of protrusions 153 in contact with the column tube 120 is greater in the proximal region 151 than in the distal region 152. Thus, a proximal static friction coefficient M1 in the proximal region 151 is greater than a distal static friction coefficient M2 in the distal region 152. That is, the proximal region 151 having the greater maximum static friction coefficient is located closer to where the second dynamic friction force DF2 is generated. This reduces the likelihood of the first impact absorber 150 being twisted relative to the column tube 120, thus preventing the first impact absorber 150 from unintentionally sliding over the column tube 120.

Then, as the column tube 120 is further moved into the housing 130, the third impact absorber 135 is broken by the end edge of the elongated tube hole 121 in the column tube 120. Thus, the impact is further absorbed.

After that, although the first impact absorber 150 is stopped at a designed position relative to the housing 130, the column tube 120 is further moved into the housing 130. This generates a first dynamic friction force between the first impact absorber 150 and the column tube 120, and the first dynamic friction force absorbs the impact.

In summary, the column tube 120 and the first impact absorber 150 are coupled together such that the proximal static friction coefficient M1 is greater than the distal static friction coefficient M2. This structure allows the second dynamic friction force DF2 to be generated near the region having the proximal static friction coefficient M1. Thus, in the event of a secondary collision, the steering apparatus 100 absorbs the impact of the secondary collision in a desired order (in a desired profile).

The disclosure is not limited to the embodiment described above and may be modified in various ways. For example, other embodiments of the disclosure may be made by combining any of the structural elements described in the embodiment or by eliminating any of the structural elements. The disclosure also includes variations of the embodiments that are conceivable by those skilled in the art and that fall within the scope of the disclosure defined by the features recited in the claims.

Figure 6:
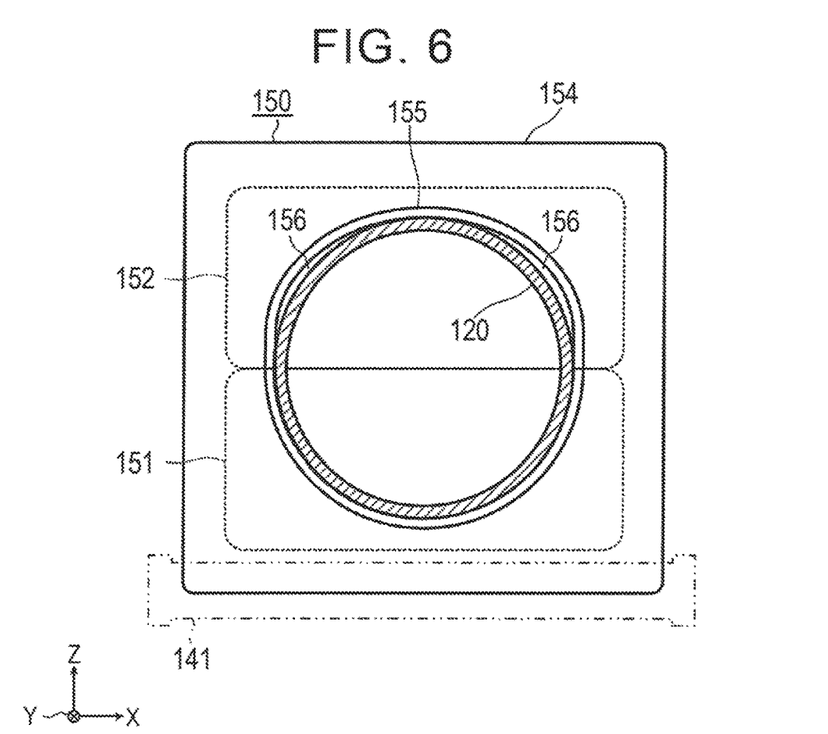
FIG. 6 is a plan view illustrating a relationship between a first impact absorber and a column tube according to a modification.

Any suitable structure other than the protrusions 153 may be used to make the proximal static friction coefficient in the proximal region 151 greater than the distal static friction coefficient in the distal region 152. For example, as illustrated in FIG. 6, at least one of the first impact absorber 150 and the column tube 120 may have recess portions 156 that are located at least in the distal region 152 and that are not in contact with the other of the first impact absorber 150 and the column tube 120. The recess portions 156 causes an area of contact between the column tube 120 and the first impact absorber 150 to be less in the distal region 152 than in the proximal region 151, thus making the distal static friction coefficient less than the proximal static friction coefficient.

As another example, at least one of the contact surfaces between the first impact absorber 150 and the column tube 120 may have surface textures that are different in the proximal region 151 than in the distal region 152 such that the distal static friction coefficient is less than the proximal static friction coefficient. Specifically, in the distal region 152, at least one of the contact surfaces between the first impact absorber 150 and the column tube 120 may be coated with low friction material, such as fluorine resin. Alternatively, at least one of the contact surfaces between the first impact absorber 150 and the column tube 120 may have surface roughness values that are different in the proximal region 151 than in the distal region 152 such that the distal static friction coefficient is less than the proximal static friction coefficient.

Although the embodiment illustrates that the protrusions 153 are in line contact with the column tube 120, the protrusions 153 may be in point contact with the column tube 120.

What is claimed is:

1. A steering apparatus comprising:
   a column shaft coupled to a steering member;
   a column tube rotatably supporting the column shaft;
   a housing through which the column tube is inserted and that supports the column tube movably in an axial direction;
   a fastener configured to fix a position of the column tube by squeezing the housing from outside the column tube such that a portion of the housing in the axial direction is reduced in diameter;
   a first impact absorber including an annular portion attached to and in contact with an outer perimeter of the column tube, the first impact absorber being configured to generate a first dynamic friction force with the column tube during a secondary collision; and
   a second impact absorber fixedly connected to the housing by a squeezing force of the fastener, the second impact absorber being configured to generate a second dynamic friction force with the housing during the secondary collision by being moved by the first impact absorber moving together with the column shaft, wherein
   the first impact absorber has a proximal static friction coefficient in a proximal region and a distal static friction coefficient less than the proximal static friction coefficient in a distal region,
   the proximal region is located close to a squeezing portion of the fastener in a radial direction crossing both the axial direction and a fastening direction of the fastener, and
   the distal region is located further from the squeezing portion than the proximal region in the radial direction.

2. The steering apparatus according to claim 1, wherein a contact area between the first impact absorber and the column tube is less in the distal region than in the proximal region so that the distal static friction coefficient is less than the proximal static friction coefficient.

3. The steering apparatus according to claim 1, wherein:
   at least one of the first impact absorber and the column tube has protrusions in contact with another of the first impact absorber and the column tube, a first number of the protrusions is located in the distal region, a second number of the protrusions is located in the proximal region; and
   the first number is less than the second number so that the distal static friction coefficient is less than the proximal static friction coefficient.

4. The steering apparatus according to claim 1, wherein:
   at least one of the first impact absorber and the column tube has a recess portion that is located at least in the distal region and that is not in contact with another of the first impact absorber and the column tube; and
   the recess portion causes a contact area between the first impact absorber and the column tube to be less in the distal region than in the proximal region so that the distal static friction coefficient is less than the proximal static friction coefficient.

5. The steering apparatus according to claim 1, wherein at least one of the contact surfaces between the first impact absorber and the column tube has surface textures that are different in the proximal region and in the distal region such that the distal static friction coefficient is less than the proximal static friction coefficient.

6. The steering apparatus according to claim 1, wherein the annular portion has an overall thickness in the axial direction, and the proximal region and the distal region each encompass the overall thickness.

7. The steering apparatus according to claim 1, wherein the distal static friction coefficient being less than the proximal static friction coefficient in the distal region reduces the likelihood of the first impact absorber being twisted relative to the column tube due to the secondary collision.

* * * * *